United States Patent
Kim

(10) Patent No.: US 6,750,781 B1
(45) Date of Patent: Jun. 15, 2004

(54) APPLIANCE CONTROL SYSTEM UTILIZING BIDIRECTIONAL POWER LINE COMMUNICATIONS

(75) Inventor: Chul Kim, 5-1207 Shindonga, Apt. 779, Yongdu-dong, Dongdaemun-gu, Seoul, 130-070 (KR)

(73) Assignee: Chul Kim, Seoul (KR)

( * ) Notice: Subject to any disclaimer, the term of this patent is extended or adjusted under 35 U.S.C. 154(b) by 0 days.

(21) Appl. No.: 09/485,065

(22) PCT Filed: Jun. 17, 1999

(86) PCT No.: PCT/KR99/00314

§ 371 (c)(1),
(2), (4) Date: Apr. 17, 2000

(87) PCT Pub. No.: WO99/66655

PCT Pub. Date: Dec. 23, 1999

(30) Foreign Application Priority Data

Jun. 17, 1998 (KR) .............................................. 98-22801

(51) Int. Cl.$^7$ ............................................. G08C 19/00
(52) U.S. Cl. ..................... 340/825.69; 340/310.01; 340/310.02; 340/825.24; 340/825.25
(58) Field of Search ................. 340/825.69, 310.01, 340/310.02, 310.04, 310.06, 825.24, 825.25, 825.72; 398/106, 107, 108, 111, 112

(56) References Cited

U.S. PATENT DOCUMENTS

| | | | | |
|---|---|---|---|---|
| 4,063,220 A | * | 12/1977 | Metcalfe et al. ............. | 340/147 |
| 4,703,306 A | * | 10/1987 | Barritt ......................... | 340/310 |
| 5,128,668 A | * | 7/1992 | Ikezaki et al. .......... | 340/825.72 |
| 5,699,515 A | * | 12/1997 | Berkeman et al. ...... | 395/200.06 |
| 6,275,922 B1 | * | 8/2001 | Bertsch ........................ | 712/36 |

FOREIGN PATENT DOCUMENTS

| | | |
|---|---|---|
| DE | 3804379 A1 | 8/1989 |
| EP | 0 100 668 A2 | 2/1984 |
| EP | 0 195 568 A2 | 9/1986 |
| EP | 0 395 495 A1 | 10/1990 |
| EP | 0 470 034 A2 | 2/1992 |
| JP | 63 141418 A | 6/1988 |
| JP | 10 094 170 A | 4/1998 |

\* cited by examiner

Primary Examiner—Michael Horabik
Assistant Examiner—Vernal U Brown
(74) Attorney, Agent, or Firm—Reed Smith, LLP

(57) ABSTRACT

A control system for controlling operations of a plurality of electric appliances in distributed arrangements. Each of a plurality of controllers is connected between the power line and respective electric appliance. A remote controller is used to provide a control message to at least one of the controllers. The controller receiving the control message from the remote controller controls the corresponding appliance according to the control message when the control message is directed thereto. When the control message is directed to another controller, the controller which receives the control message provides the control message to the other controllers via the power line. When a data collision happens in the power line, the controller which transmitted the control message to other controllers retransmits the control message after a delay time determined based on a random number.

1 Claim, 9 Drawing Sheets

FIG. 6

| HOUSE CODE | | CONTROLLER ADDRESS | | CONTROL SIGNAL | |
|---|---|---|---|---|---|
| 00H | — | 00H | 1-ST CONTR. (TRANSCEIVER) | 00H | ALL OFF |
| 01H | 1-ST SYSTEM | 01H | 2-ND CONTR. (TRANSCEIVER) | 01H | ALL ON |
| 02H | 2-ND SYSTEM | 02H | 3-RD CONTR. (TRANSCEIVER) | 02H | ON |
| 03H | 3-RD SYSTEM | 03H | 4-RD CONTR. (TRANSCEIVER) | 03H | OFF |
| 04H | 4-TH SYSTEM | ... | ... | 04H | DIM |
| 05H | 5-TH SYSTEM | DFH | 224-TH CONTR. (TRANSCEIVER) | 05H | BRIGHT |
| 06H | 6-TH SYSTEM | E0H | 225-TH CONTR. (RECEIVER ONLY) | 06H | ALL LIGHT ON |
| ... | ... | ... | ... | 07H | ALL LIGHT OFF |
| FDH | 253-TH SYSTEM | FDH | 254-TH CONTR. (RECEIVER ONLY) | 08H | STATUS REQUEST |
| FEH | 254-TH SYSTEM | FEH | 255-TH CONTR. (RECEIVER ONLY) | 09H | STATE ON |
| FFH | 255-TH SYSTEM | FFH | 256-TH CONTR. (RECEIVER ONLY) | 10H | STATE OFF |

FIG. 7

| HOUSE CODE + PARITY (4 BITS) (8 BITS) | CONTROLLER ADDRESS + PARITY (4 BITS) (8 BITS) | CONTROL SIGNAL + PARITY (4 BITS) (8 BITS) |
|---|---|---|

APPLIANCE CONTROL SYSTEM UTILIZING BIDIRECTIONAL POWER LINE COMMUNICATIONS

TECHNICAL FIELD

The present invention relates to a system for remotely controlling electrical appliances, and more particularly, to a system for remotely controlling electrical appliances utilizing power line communications and a data communication method therefor.

BACKGROUND ART

Power line communications have been utilized primarily to remotely control multiple electrical devices in distributed arrangements. In a typical power line communication system, data is modulated in a carrier having a frequency sufficiently higher than that of the AC supply voltage. The modulated wave packets are superimposed near zero-crossing points of the AC supply voltage so as to reduce an influence of noise in the power line on the system. Also, in order to further enhance a noise-immunity of the system, a data bit to be transmitted is represented by two packet positions as shown in FIG. 1. That is, a data bit is indicated by an existence or not of a packet at a zero-crossing point along with its complement at a next zero-crossing point.

In most applications utilizing such a power line communication method, more than two controllers are arranged in a manner that each controller is connected to an appliance. In such a system, however, if two controller attempts to transmit data simultaneously, data from the controllers collide and cannot be retrieved in a receiving party. Referring to FIG. 3, which illustrates a collision during a data transmission, two identical states may exist at neighboring zero-crossing points even though such a state is prohibited in a normal state.

Because of the reason, conventional power line communication methods have been not used for bidirectional communications. Also, any technical proposal for enabling bidirectional communications in a power line system has not been reported yet. Accordingly, in a conventional system, each of a plurality of receivers has to unilaterally receive control data from a master controller as shown in FIG. 2, but cannot send data to the master controller or another receiver. Even though such a system may be satisfactory in industrial applications such as a security alarm system, a garage door opener, and a lighting system in a building, the system cannot fulfill the needs of users at home. For example, a user at home wishes to control electrical appliances in each room no matter where she or he is.

DISCLOSURE OF THE INVENTION

To solve the above problem, one object of the present invention is to provide a system in which each controller allocated for each of a plurality of appliances communicates with one another so that the operation of the plurality of electric appliances in distributed arrangements are controlled conveniently.

Another object of the present invention is to provide a method for enabling bidirectional communications in a system utilizing power line communications, so that each controller engaged in the power line communication system communicates with each other.

To achieve one of the above objects, a control system of the present invention comprises: a power line; a plurality of controllers each of which is connected between the power line and one of the plurality of electric appliances; and input means for providing a control message to at least one of the plurality of controllers. The at least one of the plurality of controllers which receives the control message provides the control message to another one of the plurality of controllers via the power line. The at least one of the plurality of controllers which receives the control message may be selected arbitrarily by a user of the input means.

A method of transmitting data to the plurality of external controllers according to the present invention to achieve another one of the above objects is implemented in a controller connected to at least one electric appliance for controlling an operation of the at least one electric appliance and to a plurality of external controllers through a power line to communicate bidirectionally with the plurality of external controllers for receiving and transmitting a control message for controlling the operation of correspondingly connected electric appliance. The method comprises the steps of: (a) transmitting a first data to the plurality of external controllers via the power line and detecting a second data from the power line; (b) comparing the first and the second data; and in case that the first and the second data is not the same as each other, determining that a failure occurred, canceling the transmitting step, and re-transmitting the first data to the plurality of external controllers after a delay time is elapsed.

BRIEF DESCRIPTION OF THE DRAWINGS

The above objects and advantages of the present invention will become more apparent by describing in detail preferred embodiments thereof with reference to the attached drawings in which:

FIG. 6 is a table summarizing house codes which can be assigned to a plurality of neighboring systems and addresses which can be assigned to the controllers in a system;

FIG. 7 illustrates a data format which is used in the bidirectional power line communication of the present invention;

In the drawings and following description, the same reference numerals will be given to similar or corresponding elements.

Embodiments

Figure 4:
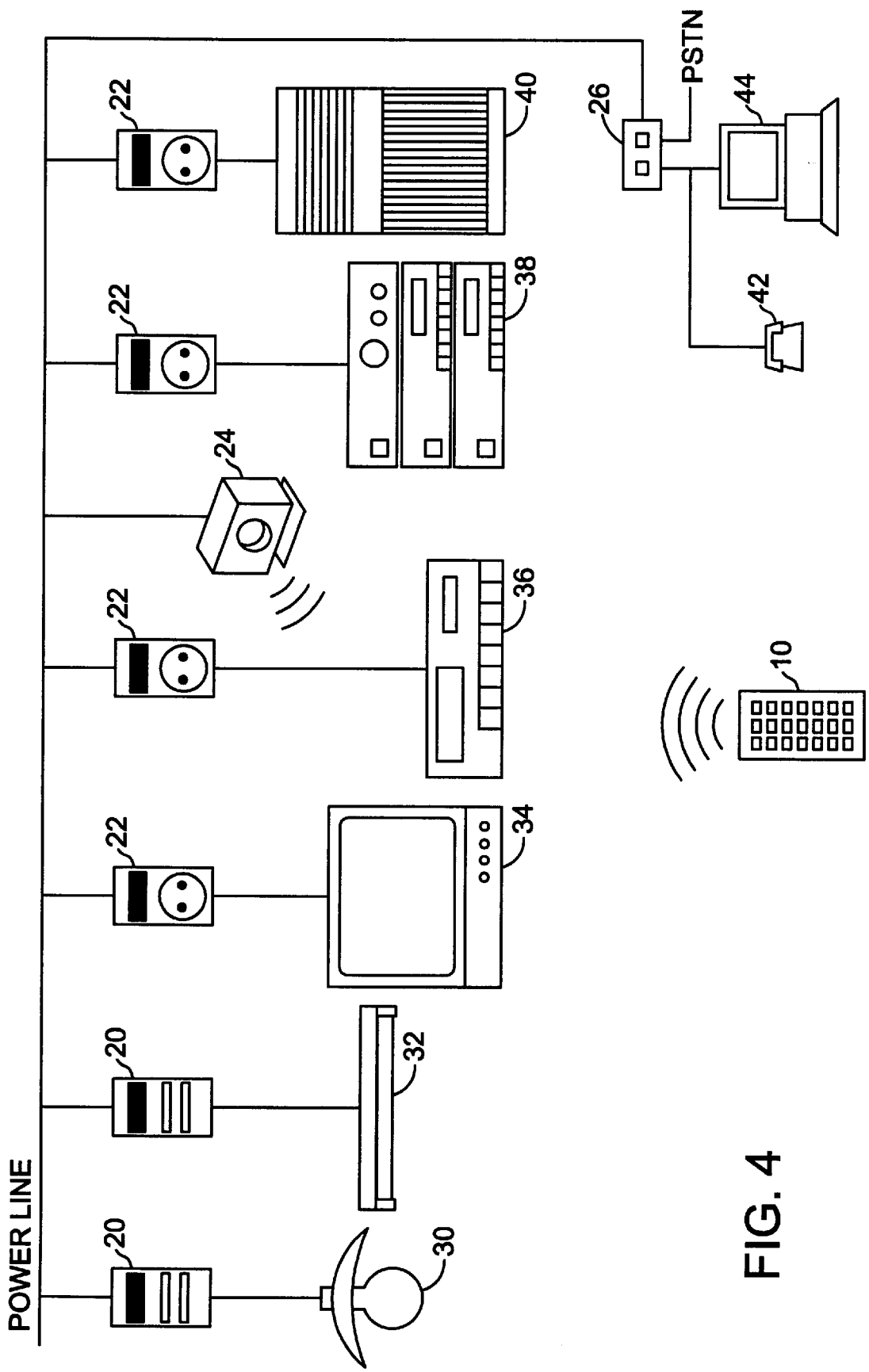
FIG. 4 exemplifies a home automation system employing controllers according to the present invention.

Referring to FIG. 4, a home automation system employing controllers according to the present invention includes a plurality of controllers 20, 22, 24, and 26, and electric appliances 30 through 40 powered through the controllers 20, 22, and 26. Each of the controllers 20, 22, 24, and 26 is connected to a power line and controls the operation of the appliance connected thereto in response to a respective control signal.

Among the controllers, the controller 20, which is a switch module, controls the turning on or off and dimming of a lighting such as an electric lamp 30 and a fluorescent lamp 32. The controller 22, which is a receptacle module, has two holes for inserting a plug of an appliance and maintains or stops a power supply to the appliance connected thereto. Appliances which may be powered through the controller 22 include a television receiver 34, a video cassette recorder (VCR) 36, a component audio system 38, and an air conditioner 40. The controller 24 is an infrared (IR) generator operative as a remote controller signal generator which itself is controlled remotely. Such a controller 24 controls the turning on/off, and the volume level of appliances in front of the controller 24 in response to a control signal provided externally.

In the present invention, the control signal for controlling the operation of one of the controllers is provided in various manners. First, the control signal may be provided directly from the remote controller 10 manipulated by the user. For this purpose, each of the controllers 20, 22, and 24 has an IR sensor on the front panel thereof. Also, the controller may be provided with the control signal from a separate switch or a sensor. For example, a light controller 20 for controlling the lighting 20 or 32 has at least one on/off switch, so that the user turns on/off the lighting 20 or 32 by use of the switch. In case that the lighting 20 or 32 is installed on the ceiling of a passage or a staircase, the lighting may be incorporated with a illumination detection sensor so that the lighting is turned on/off in response to a control signal from the sensor.

Figure 5:
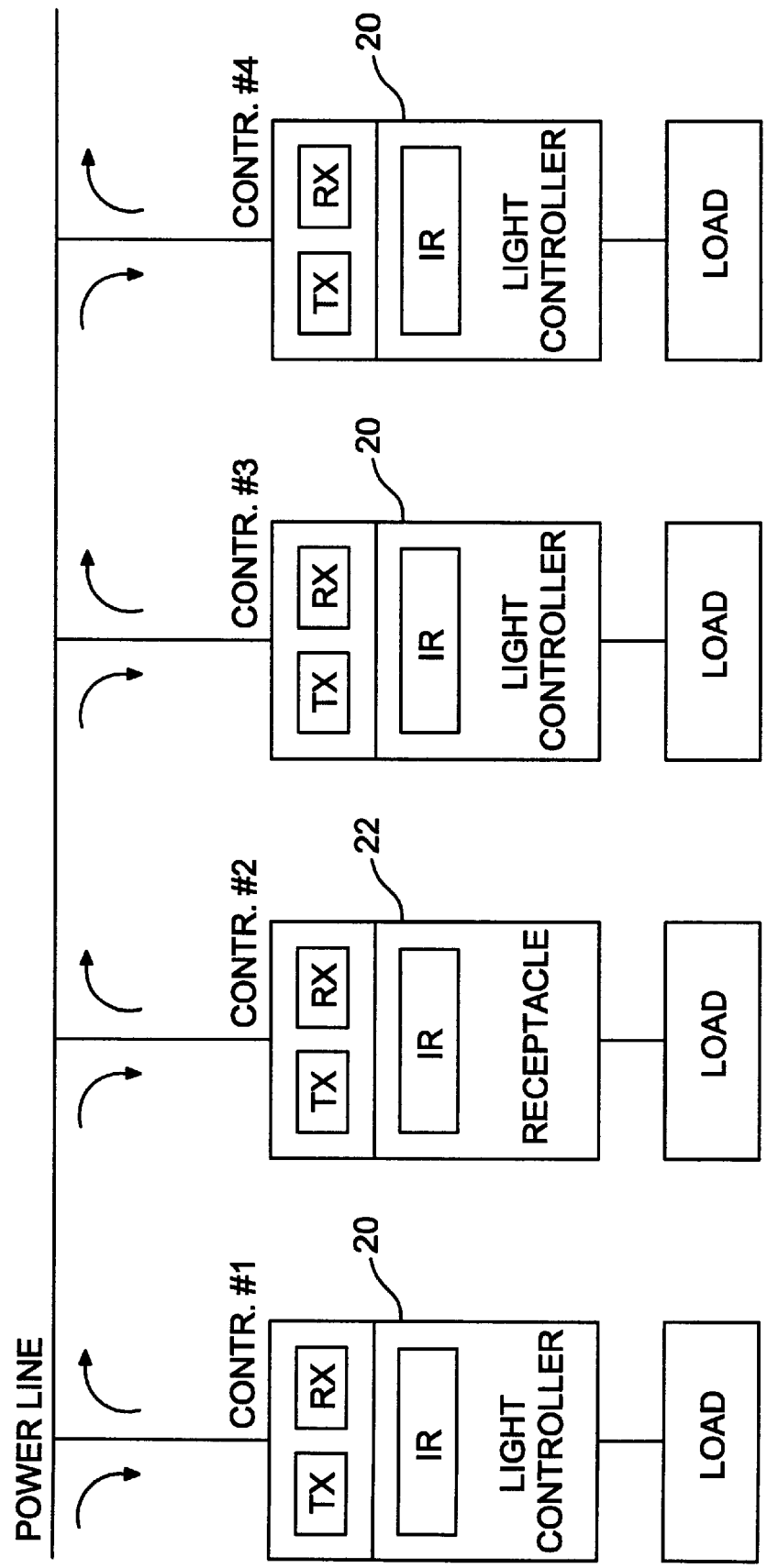
FIG. 5 illustrates a bidirectional power line communication method between the controllers in the present invention.

Meanwhile, each controller can bidirectionally communicate with another through a power line. FIG. 5 illustrate such bidirectional communications between the controllers. Accordingly, each controller can receive a control signal from the remote controller 10 via another controller. In such a case, a controller receiving the infrared signal from the remote controller 10 provides the control signal to another controller via the power line no matter to what appliance the control signal is directed. In an alternative embodiment, however, the controller receiving the infrared signal may provide the control signal only when it is determined that the control signal carried by the infrared signal is not directed to itself, which is described in detail below.

On the other hand, the controller 26 operative as a telephone module in FIG. 4 has a terminal connected to a telephone line by use of a RJ-11 connector, another terminal connected to the power line, and the other terminal connected to a telephone 42 or a telephone port of a computer 44. The telephone module 26 can receive an incoming call by itself, and receive and modulate a control signal transferred through the telephone channel in a call-receiving mode to transmit a modulated signal to the other controllers. Thus, the user can make a call to the home from outside to control the operation of the appliances. Those of skilled in the art will appreciate that such a telephone module can be implemented easily from the following description of the other kinds of controllers.

In order to ensure the bidirectional communication and the transfer of control signal between the controllers, each controller is assigned with its own address. Also, to suppress any interference between adjacent houses or systems, each system is assigned with its own house code. FIG. 6 summarizes house codes which can be assigned to each of a plurality of neighboring systems and addresses which can be assigned to each of the controllers in a system. As can be seen in the drawing, the house code is comprised of eight bits and has one value in a range from 1 to 255. A house code of value 0 is not used since the code value cannot be discriminated from a null state, i.e., a state in which there is no signal being transferred through the power line. Also, the controller address is comprised of eight bits and has one value in a range from 0 to 255. Meanwhile, some but insignificant number of controllers may have only signal receiving capabilities rather than bidirectional communication capabilities, so that the user can reduce the system cost.

When the system is installed initially, the house code and the address both of which are stored in each controller is in the initial condition of 00H. If the user issues a setup command by use of the remote controller 10, for example, at least one of the controllers transmits a hail request signal through the power line in response to the command. All the controllers receiving the hail request responds to the request by sending a house code and address stored therein. At this time, controllers in neighboring systems can participate in the responding. The controller which issued the hail request selects randomly one of the house codes which is possible but not used by the neighboring systems and determines the selected house code as the code for the system. The determined house code is notified to the other controllers in the system. Meanwhile, the controller addresses may be assigned by the user. Alternatively, however, the addresses may be arranged by the controller which issued the hail request.

On the other hand, control signals for activating the controllers are comprised of four bits. Thus, the system has sixteen kinds of control signals. Besides the power on/off instruction, the control signals include a status request and turning off instruction directed to all the controllers, and so on. Also, the house code update instruction may be one of the control signals. Control signals not shown in FIG. 6 may be reserved for the choice of the user.

FIG. 7 illustrates a data format which is used in the bidirectional power line communication of the present invention. As can be seen in the drawing, the house code of eight bits is incorporated with parity check bits of four bits and thus represented in twelve bits. Similarly, the controller address of eight bits is incorporated with parity check bits of four bits and thus represented in twelve bits. Here, the parity check bits are obtained according to Hamming code scheme. As the parity check bits are introduced, each controller can correct some random errors by itself in the present invention. Also, the delay in the communications due to the Automatic Response Request (ARQ) and acknowledgment (ACK) may be obviated. In the description below, a data structure of 32 bits shown in the FIG. 7 will be referred to as a control message.

Figure 1:
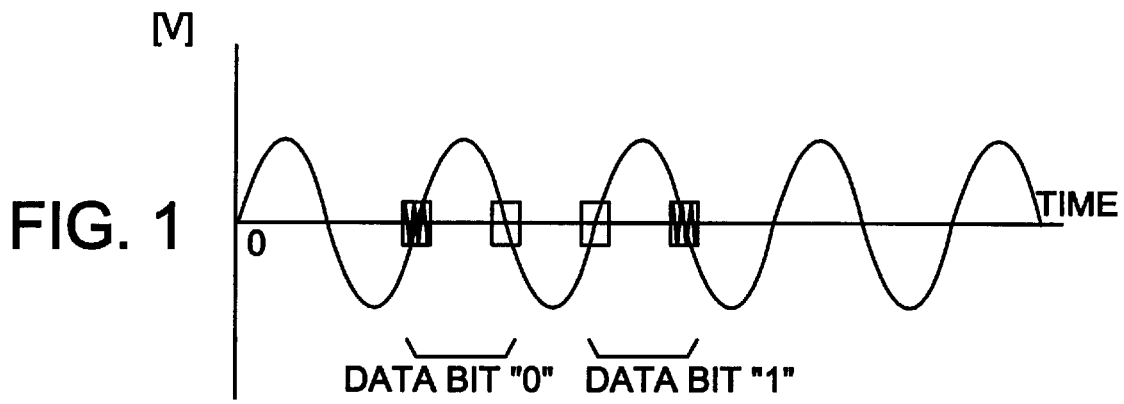
FIG. 1 illustrates a typical shape of a modulated signal in a power line communication system.
Figure 2A:
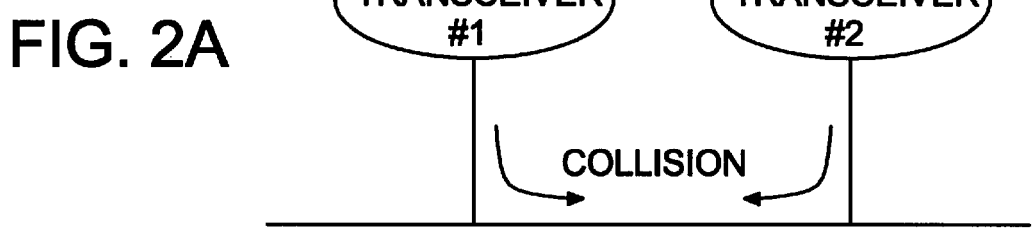
FIGS. 2A and 2B illustrate a conventional power line communication method.
Figure 2B:
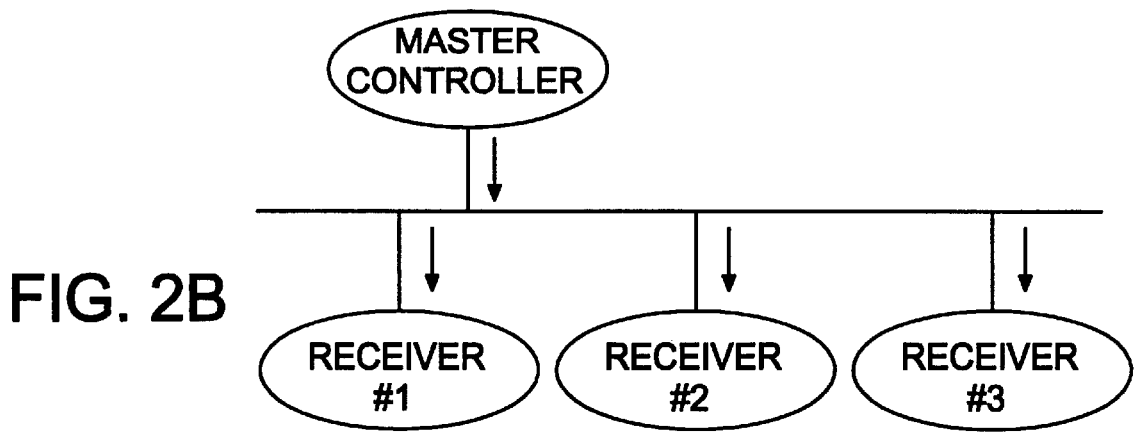
Figure 3:
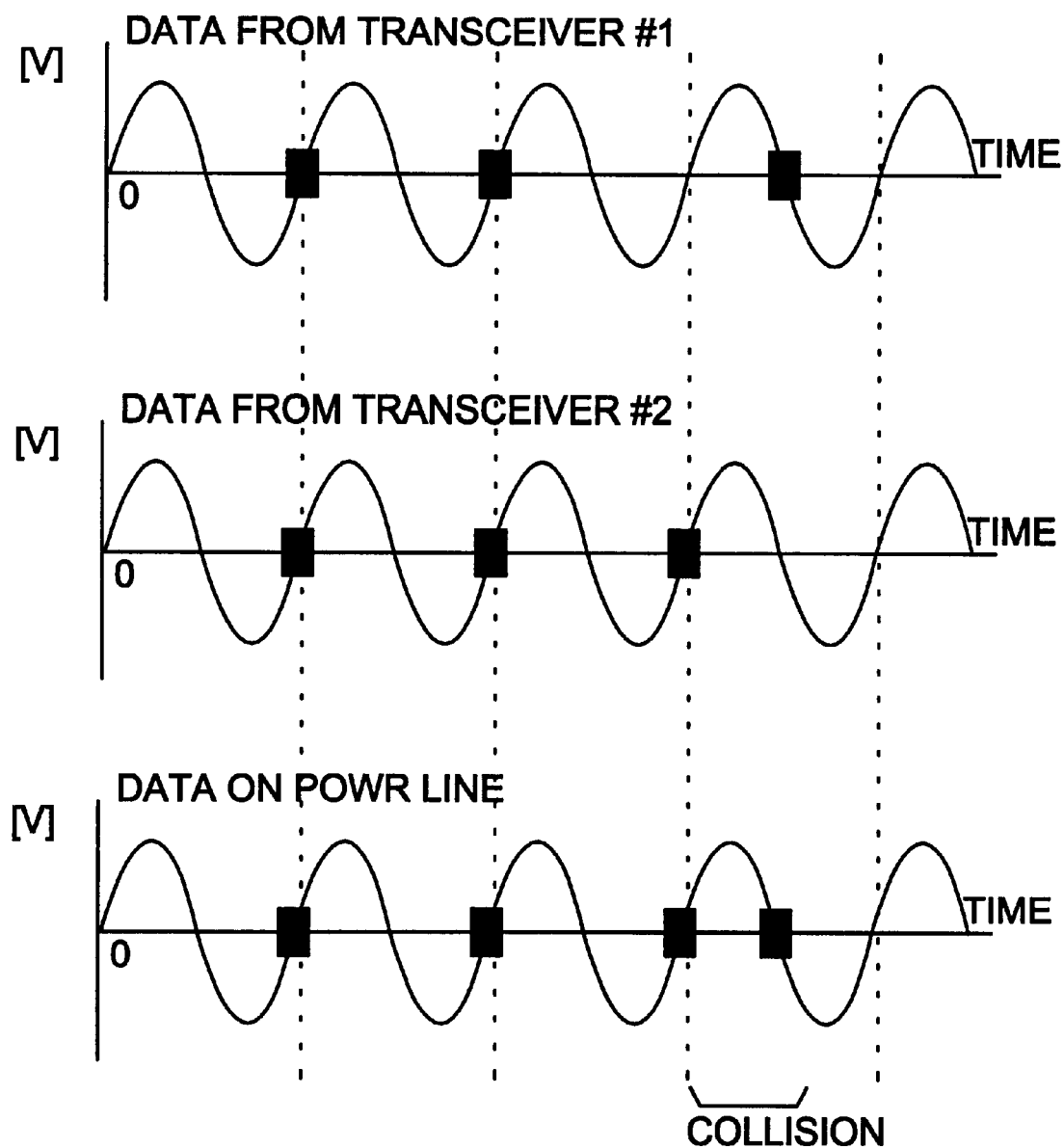
FIG. 3 is a waveform diagram for explaining a collision during a data transmission in the power line communication system.

The reader should note that, in the present invention, all or significant number of controllers are operative as a master controller which controls the other controllers, rather than just a signal controller operates as a master controller while the other ones operate as a passive or slave controller. Accordingly, in a house equipped with the home automation system of FIG. 1, the user can control any appliance in the other room or outside the house by giving an appropriate command by use of the remote controller 10 no matter where the user is. Thus, the benefits of the home automation system is enhanced considerably.

Figure 8:
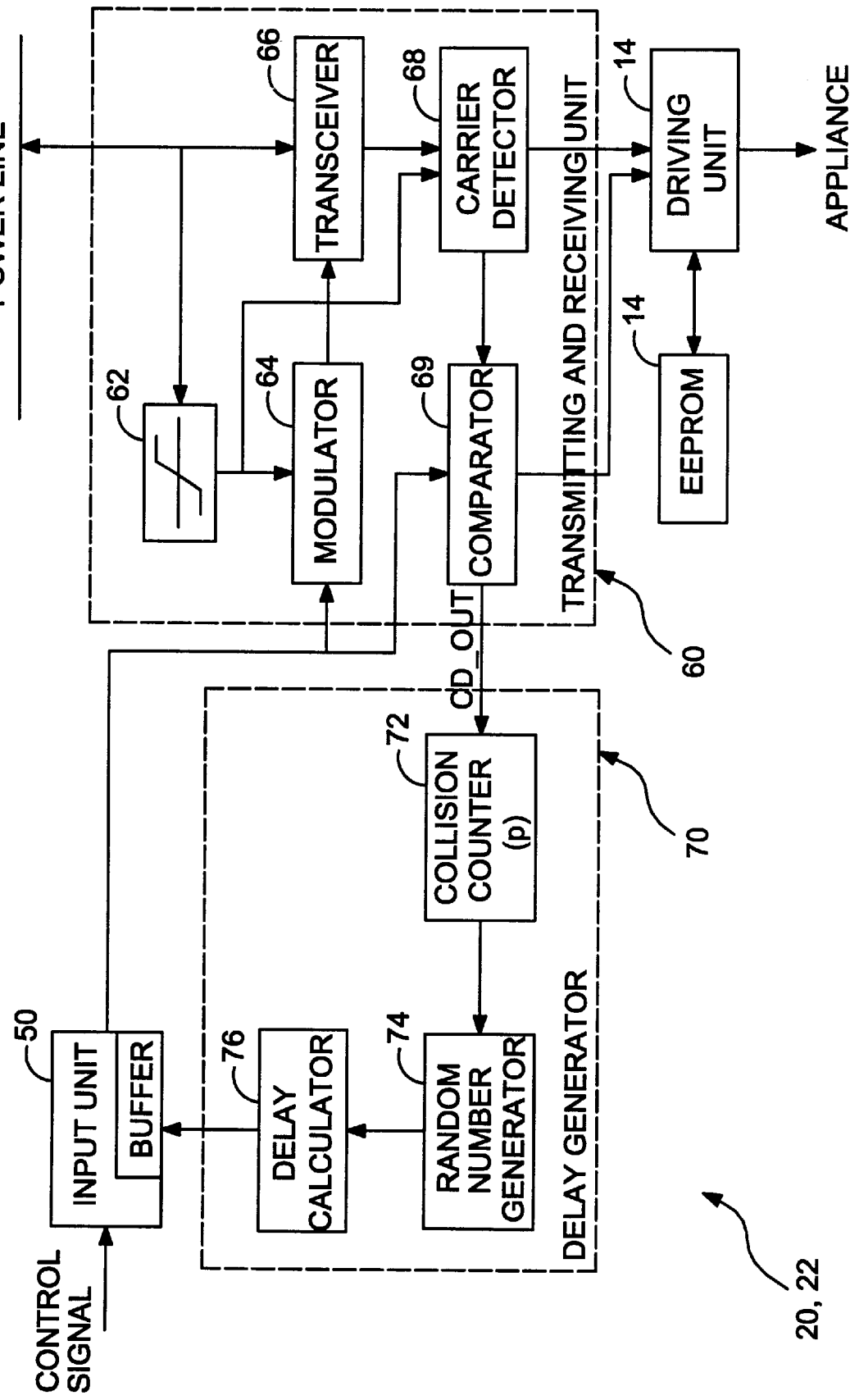
FIG. 8 is a block diagram of an embodiment of the controller according to the present invention.

FIG. 8 is a block diagram of an embodiment of the controller according to the present invention. The controller includes an input unit 50, a transmitting and receiving unit 60, a delay generator 70, a driving unit 80, and a memory 82.

The input unit 50 receives input data from the remote controller, the switch, or the sensor. If the received data is provided by the switch or the sensor and is a control signal directed to the controller itself, the input unit 50 provides the received data to the driving unit 80 so that the driving unit 80 carries out an operation corresponding to the input data. For the sake of simplicity, any signal path for this case is not shown in FIG. 8. On the other hand, in case that the received data is the control message provided by the remote controller 10, the input unit 50 stores the received data in an internal buffer and provides such data to the transmitting and receiving unit 60 so that the transmitting and receiving unit 60 transmits the data through the power line.

The transmitting and receiving unit 60 transmits the control message from the input unit 50 through the power line and receives a control message from the power line. Also, the transmitting and receiving unit 60 monitors whether data from more than one controllers collide in the power line. In the transmitting and receiving unit 60, a zero-crossing detector 62 detects a zero-crossing point while following the AC voltage level of the power line, to output a zero-crossing detection signal. A modulator 64 modulates the control message from the input unit 50 in synchronicity with the zero-crossing detection signal. The present invention employs the conventional modulating scheme of FIGS. 1A and 1B, and thus detailed description thereof will be omitted.

A transceiver 66 transmits a modulated signal from the modulator 64. Also, the transceiver 66 detects the voltage level of the power line to receive a control message superimposed in the AC voltage. A carrier detector 68 detects a control message from the power line voltage level in synchronicity with the zero-crossing detection signal. A comparator 69 receives the input data and the control message from the input unit 50 and the carrier detector 68, respectively, and compares such data. If the comparison result shows that the input data and the control message are the same as with each other, the comparator 69 determines that the control message was derived from the controller in which the comparator itself is included. In case that the input data and the control message are not identical, however, the comparator 69 determines that a data collision happened and outputs a collision detection signal CD_OUT.

When a data collision happens, the delay generator 70 generates a delay signal for delaying the transmission of the data from the input unit 50. For this end, a collision counter 82 counts the collision detection signal CD_OUT to output a counted collision number (p). A random number generator 84 selects a number in a range from 0 to $(2^p-1)$ according to a predetermined random number generating algorithm. Accordingly, the larger the accumulated collision number (p) is, the wider the range of numbers which can be adopted as the random number. A delay calculator 86 calculates a delay time which is determined based on the random number as follows.

$$Delay\ (D) = T*(\text{Number of data bits of control message})*f$$

In the above equation, the number of data bits of control message indicates the number of bits included in one control message and is 32 in the case of data format of FIG. 7. Meanwhile, f denotes the frequency of AC voltage and is 50 Hz or 60 Hz depending on the country in which the system is used.

When the delay time is expired, the input unit 50 outputs the input data to the transmitting and receiving unit 60 again, so that the transmitting and receiving unit 60 re-transmits the control message through the power line. In the present embodiment, the delay calculator 76 provides a trigger signal to the input unit 50 when the delay time is expired, so that the input unit 50 outputs the stored data in response to the trigger signal. In an alternative embodiment, however, the delay calculator 76 provides a calculated delay time to the input unit 50, so that the input unit 50 waits for the expiration of the delay time and outputs the stored data upon the completion of downcounting of the delay time. Alternatively, the input unit 50 and the delay generator 80 may be implemented in a microcontroller. In such a case, the input unit 50 and functional blocks in the delay generator 80 are implemented by an executable computer software loaded in the microcontroller.

The driving unit 80 receives the control message and the collision detection signal CD_OUT from the carrier detector 68 and the comparator 69, respectively. When the collision detection signal CD_OUT is deactivated and the address contained in the control message is the same as that stored in the memory 82, the driving unit 80 performs a control operation dictated by the control signal in the control message. When the address contained in the control message is not the same as that stored in the memory 82, i.e., the control message is directed to another controller, the driving unit 80 does not perform the control operation dictated by the control signal in the control message. Also, when the collision detection signal CD_OUT is activated to indicate a data collision status, the driving unit 80 does not perform the control operation dictated by the control signal in the control message. In the present embodiment, the memory 82 is implemented by an EEPROM and stores setup parameters of the controller including the house code and the controller address.

Figure 9A:
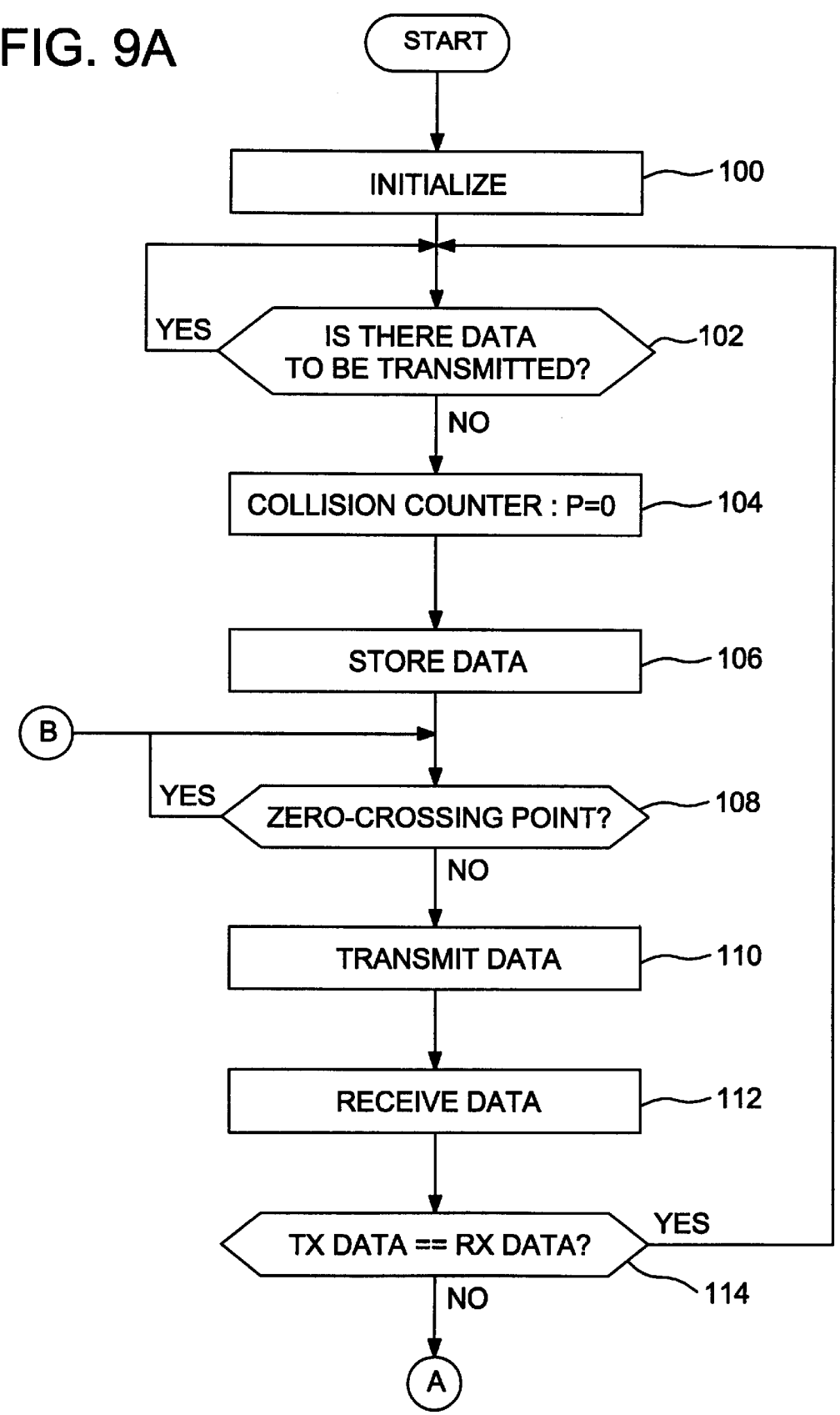
FIGS. 9A and 9B are flowcharts showing a data communication method in a power line communication system employing the controller of FIG. 8.
Figure 9B:
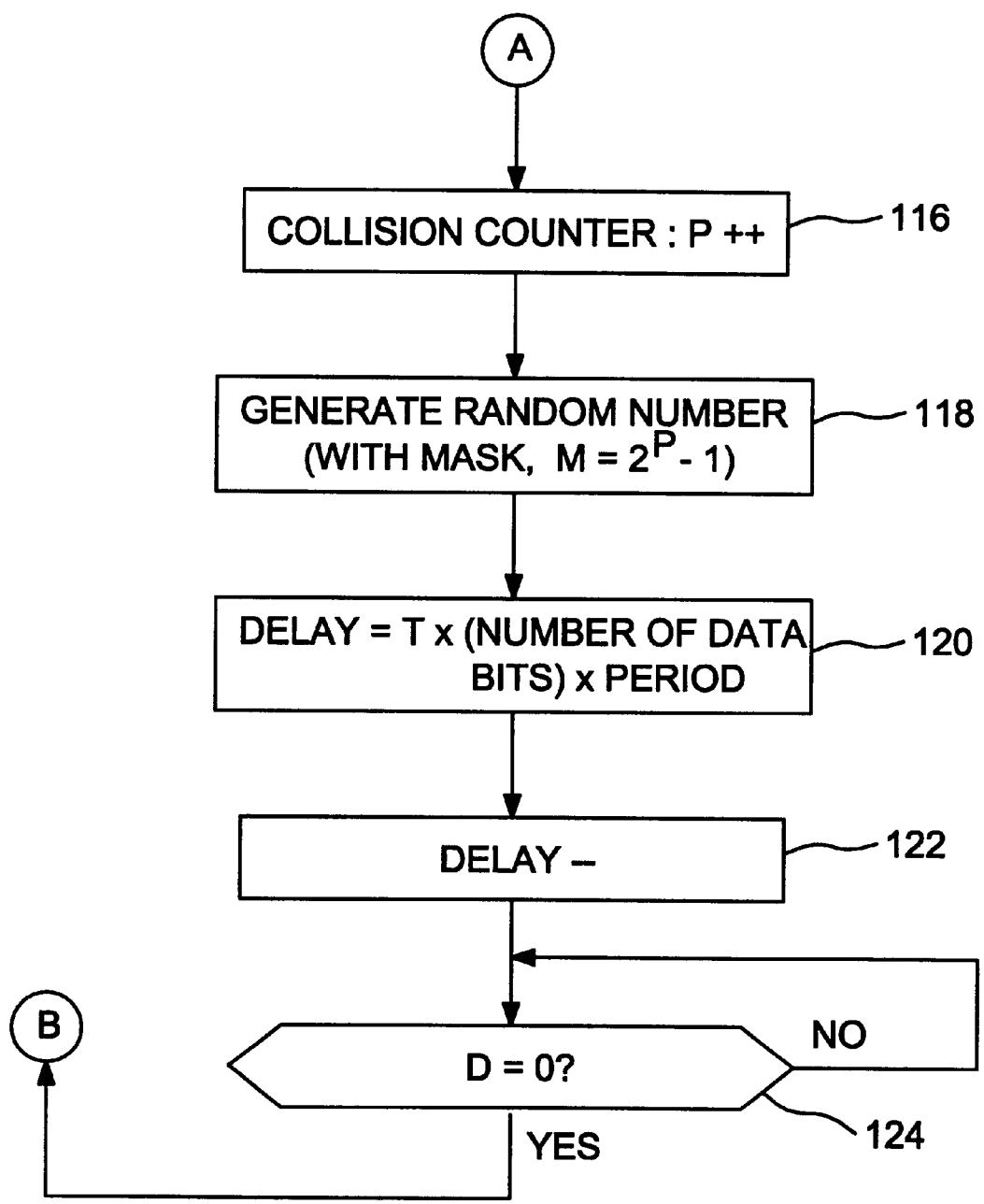

FIGS. 9A and 9B are shows a data communication method in a power line communication system employing the controller of FIG. 8. In an initial state (step 100), each controller maintains a stand-by status while determining whether there is a received signal (step 102). If there is data to be transmitted, the collision counter 82 is reset so that the collision number (p) is initialized to zero (step 104). Also, data to be transmitted is temporarily stored in the buffer of the input unit 50 (step 106). Subsequently, zero-crossing points are detected in step 108, and the massage to be transmitted is transferred near the zero-crossing points while the message imposed in the power line is received (steps 110 and 112).

Afterwards, the transmitted data is compared with the received data to determine whether there exists a data collision in the power line (step 114). If the data to be transmitted is identical to the received data until the data is completely transmitted, the controller determines that any data collision has happened and prepares to receive and send next message (step 102). If the data to be transmitted is not identical to the received data, however, the controller determines that a data collision has happened and stops the transmission and prepares a re-transmission.

Steps 116 through 124 shows the preparation of the re-transmission in detail. When a collision occurs, the collision number (p) is incremented by one and a random number is generated in a range of $(2^p-1)$ which is one in this situation (steps 116 and 118). Subsequently, a delay time for re-transmission is determined based on the random number (step 120). Afterwards, the controller is in the stand-by state while downcounting the delay time determined in the step 120 (steps 122 and 124). When the delay time is expired, the procedure is returned to the step 108 so that the controller attempts a re-transmission.

Meanwhile, if another collision occurs during the re-transmission procedure, the collision number (p) is incremented to two in this case. Accordingly, the range from which the random number is generated is enlarged. That is, while the random number may have zero or one just after the first collision, but the number may have one value from zero to three. Further, after another re-transmission is tried but failed because of a third collision, the random number may have one value from zero to seven.

As described above, the present embodiment adopts a collision detect multiple access (CDMA) scheme for bilateral communications between the controllers. As another collision occurs, the stand-by period may be lengthened so that the possibility of a successful transmission is enhanced.

Although the present invention has been described in detail above, it should be understood that the foregoing description is illustrative and nor restrictive. Those of ordinary skill in the art will appreciate that many obvious modifications can be made to the invention without departing from its spirit or essential characteristics. In practice, other specialized circuitry could be used to perform the same function as called for by the specific application. Accordingly, the scope of the invention should be interpreted in the light of the following appended claims.

Industrial Applicability

As described above, In the present invention, all or significant number of controllers are operative as a master controller which controls the other controllers, rather than just a signal controller operates as a master controller while the other ones operate as a passive or slave controller. Thus, the versatility of the power line communication systems are enhanced significantly. Particularly, in a house equipped with the home automation system of FIG. 1, the user can control any appliance in the other room or outside the house by giving an appropriate command by use of the remote controller 10 no matter where the user is. Thus, the benefits of the home automation-system is enhanced considerably.

What is claimed is:

1. A control system for controlling operations of a plurality of electric appliances in distributed arrangements, comprising:
   a plurality of controllers each of which is connected between a power line and a respective appliance to control said respective electric appliance;
   a remote controller for providing any one of said plurality of controllers with a control message containing a house code, a controller address assigned for one of the controllers, and a control signal for controlling an electrical appliance associated with the controller assigned with the controller address, wherein each of said plurality of controllers comprises:
   an infrared sensor;
   a driving unit for driving the electric appliance coupled to said controller;
   a transmitting and receiving unit electrically coupled to the power line and said driving unit to transmit and receive the control message via the power line and to provide the control signal to the driving unit when the control message is directed to said controller;
   a buffer, coupled to said infrared sensor, for receiving the control message from said remote controller through the infrared sensor to provide to said transmitting and receiving unit and temporarily storing the control message to be transmitted to the other controllers through said transmitting and receiving unit in response to a delay control signal; and
   a delay generator coupled to said transmitting and receiving unit and said buffer to generate the delay control signal when a data collision occurs in the power line, the delay generator comprising a random number-generator for generating a random number in a numerical window of which size changes according to the equation $T=(2^P-1)$, where T and p denote the random number and an accumulated number of collision, respectively; and a delay calculator for calculating a delay time proportional to the random number to generate the delay control signal after the delay time is elapsed,
   wherein said transmitting and receiving unit provides the control signal contained in the control message to said driving unit when receiving the control message directed to said controller from said remote controller or the power line, and wherein said transmitting and receiving unit modulates the control message to transmit a modulated signal to the other controllers via the power line in case the control message from said remote controller is directed to another controller.

* * * * *